United States Patent [19]

Batchelder

[11] Patent Number: 5,223,107
[45] Date of Patent: Jun. 29, 1993

[54] ELECTRODIALYSIS METHOD FOR DEMINERALIZATION OF LIQUID, WHEY-BASED MATERIAL

[75] Inventor: Bruce T. Batchelder, North Reading, Mass.

[73] Assignee: Ionics, Inc., Watertown, Mass.

[21] Appl. No.: 708,307

[22] Filed: May 31, 1991

[51] Int. Cl.⁵ .............................................. B01D 61/44
[52] U.S. Cl. ........................... 204/182.6; 204/182.4; 204/182.3
[58] Field of Search ............... 204/182.6, 182.4, 182.3

[56] References Cited

U.S. PATENT DOCUMENTS

| | | | |
|---|---|---|---|
| 2,758,965 | 8/1956 | Block et al. | 204/182.6 |
| 3,320,072 | 5/1967 | Clark et al. | 204/182.6 |
| 3,325,389 | 6/1967 | Parsi et al. | 204/182.6 |
| 3,496,081 | 2/1970 | Scheder | 204/182.6 |
| 3,544,436 | 12/1970 | Francis et al. | 204/180 |
| 3,595,769 | 7/1971 | Scheder | 204/182.6 |
| 3,755,134 | 8/1973 | Francis et al. | 204/301 |
| 3,905,886 | 9/1975 | Wang | 204/180 |
| 4,110,175 | 8/1978 | Ahlgren et al. | 204/182.6 |
| 4,138,501 | 2/1979 | Chaveron et al. | 426/239 |
| 4,146,456 | 3/1979 | Taneya et al. | 204/182.6 |
| 4,227,981 | 10/1980 | Williams et al. | 204/182.6 |
| 4,322,275 | 3/1982 | Jain | 204/180 |
| 4,855,056 | 8/1989 | Harju et al. | 210/638 |
| 4,971,701 | 11/1990 | Harju et al. | 210/638 |

FOREIGN PATENT DOCUMENTS 733058  4/1966  Canada ........................ 204/182.6

OTHER PUBLICATIONS

"Electrodialysis Applications in Whey Processing" by Bruce T. Batchelder, Ionics, Incorporated (International Whey Conference, Chicago, Ill., Oct. 28, 1986).

Primary Examiner—John Niebling
Assistant Examiner—Arun S. Phasge
Attorney, Agent, or Firm—Lahive & Cockfield

[57] ABSTRACT

A process for demineralization of whey-based material using electrodialysis. The process involves increasing the conductivity of the diluting stream, i.e, the stream containing the material to be demineralized, at one or more points in time during the electrodialysis cycle. When removal of divalent ions is desired, the increased conductivity may occur by the addition of salts of monovalent ions.

20 Claims, 3 Drawing Sheets

ELECTRODIALYSIS METHOD FOR DEMINERALIZATION OF LIQUID, WHEY-BASED MATERIAL

BACKGROUND OF THE DISCLOSURE

This invention relates to demineralization of liquid, whey-based material using electrodialysis.

The liquid whey remaining after the conversion of milk into cheese or casein contains a significant proportion of the nutritive materials originally present in the milk. For this reason whey is widely used as an ingredient in animal feed and human foods. The value of whey for use in foods can be enhanced by removal of some of the contained minerals. Several processes can be employed for this purpose, including ultrafiltration, ion exchange, and electrodialysis.

One important application for whey, from which the majority of minerals have been removed, is as an ingredient in infant formula. Reduced minerals whey ("RMW") has been used in premium infant formulas since the 1950's. Due to the importance of this product, and the legislation and guidelines that regulate its manufacture and sale, demineralized whey used in infant formula must meet a variety of specifications including those concerning the concentration levels of individual mineral ions.

Infant formula is one of the few human foods whose composition is mandated by law. For certain minerals, minimum levels are specified and are as important as the maximum levels. The Infant Formula Act of 1980 came into being as a result of the unfortunate situation in the late 1970's in which severe illness of a number of infants was traced to their prolonged exclusive use of a soy formula deficient in chloride.

Highly reduced minerals whey is often the majority ingredient (other than water), representing a significant portion of the total solids contained in infant formula. The overriding reason for using whey in infant formula is that it allows manufacture of a product that is similar to human milk in its (60:40) ratio of whey proteins (mainly β-lactoglobulin and lactalbumin) to casein.

Electrodialysis, due to its gentle method of desalting and the composition of remaining minerals and other materials, is especially suited for producing highly demineralized whey for use in infant formula. For this end use, typically 85% to 95% of the minerals are removed from the whey in a batch operation of, for example, four to six hours duration or a continuous process with stage-by-stage recycle. However, during certain calendar periods relating to seasonal variations in milk supply, or when processing some types of whey, the electrodialysis process is at times prolonged by difficulty in removing sufficient quantities of certain divalent mineral ions, especially calcium, magnesium, and phosphate.

In milk by-products, such as whey, significant percentages of these divalent minerals are present in non-ionic form. They are bound in protein complex and do not readily enter solution as free ions, available to be removed by electrodialysis. It is due to this phenomenon that electrodialysis exhibits substantial selectivity for the relative removal of monovalent ions during the initial stages of demineralization of milk and its by-products.

Total worldwide electrodialysis production of demineralized whey is estimated at 150,000 metric tons (330 million pounds) of reduced mineral whey solids (dry basis) per year. Some electrodialysis facilities installed in dairy plants worldwide have an installed capacity to demineralize 500,000 Kg (1,100,000 pounds) or more per day of fluid whey.

Electrodialysis as a process is dependent on conductivity to create the flow of current necessary to remove mineral ions. The situation can occur near the end of extensive demineralization, (due to the combination of low conductivity, back diffusion of minerals from the salt collecting stream, and slowness of the divalent ions to release from protein complex) that the desired maximum concentration level of a particular divalent ion, usually calcium (but on occasion magnesium or phosphate) is difficult to achieve. Under these circumstances, electrodialysis is prolonged and the cost of manufacturing the product increased.

Even under usual conditions of producing highly demineralized whey by electrodialysis, the endpoint in terms of the desired level of divalent mineral ions, especially calcium, is reached considerably after the desired endpoint levels of other mineral ions such as potassium and sodium (monovalent ions). In many cases it is necessary to add back quantities of the latter minerals in order to achieve the proper composition for infant formula.

Thus, there remains a need for an improved method of demineralizing liquid, whey-based materials by electrodialysis that more efficiently achieves the desired balance of minerals required for use in infant formula and other products.

SUMMARY OF THE INVENTION

The method of the present invention generally involves demineralization of liquid, whey-based materials using electrodialysis. Specifically, the method includes improving the output of demineralized whey product by increasing the conductivity of the solution that is being demineralized during the electrodialysis process. In one form of the invention, the increased conductivity occurs at a preselected point during an electrodialysis batch cycle.

The method of the invention is preferably, but not exclusively, performed using an electrodialysis apparatus of the type generally commercially available from Ionics, Incorporated, under the trade name Electromat®. The Electromat apparatus includes at least one membrane stack consisting of, in stacked relation, an anode, a cathode, and at least four ion exchange membranes. The membranes are alternately anionic and cationic ion exchange membranes, forming a succession of diluting cells and concentrating cells between the electrodes. The solution to be demineralized is placed in the diluting cells, and a d.c. voltage applied across the anode and cathode, establishing current flow within the cells. In response to the applied voltage, ions are transported across the respective membranes into adjacent concentrating cells.

To produce highly demineralized product, electrodialysis may be conducted as a batch cycle, which cycle may be defined as beginning at the time, $t_b$, at which the solution to be demineralized is introduced to the diluting cells, and terminating at the time, $t_e$, at which satisfactorily demineralized solution is taken from the diluting cells. The cycle may be regulated by a process controller.

In performing the batch method of the present invention, at $t_b$, a quantity or batch of liquid, whey-based material to be demineralized begins to be introduced into the diluting cells and a quantity of ion collecting medium, such as brine, is introduced into the concentrating cells. A voltage is then applied across the electrodes of the electrodialysis apparatus to induce ions to migrate from the diluting cells, across the ionic membranes, into the adjacent concentrating cells.

In the exemplary case of electrodialysis of cheese whey material, monovalent mineral ions are initially removed in greater numbers than divalent mineral ions relative to their concentrations in the whey material, although both are removed. As the ion concentration in the diluting cells decreases, the conductivity in those cells decreases. As the conductivity decreases, the rate of removal of ions decreases. Due to the differential migration rates of monovalent and divalent ions, the solution in the diluting cells has a higher ratio of divalent to monovalent mineral ions as compared to the relative initial concentrations.

According to the method of the present invention, the ion concentration of the diluting cells is increased at one or more preselected times during a batch electrodialysis cycle or at one or more selected points in a straight through continuous or stage-by-stage recycle continuous electrodialysis process. In a preferred embodiment of the invention, specifically for demineralization of whey-based material, this is accomplished by introducing a quantity of monovalent salt solution to the diluting stream, thus increasing monovalent mineral ion concentration. With the increased monovalent ion concentration, the migration process is enhanced to effect increases in transport of divalent ions across the respective membranes as will be more clearly set forth in the examples. As a consequence, the hitherto difficult-to-remove divalent ions of the whey material are effectively removed from the diluting cells along with the relatively easy-to-remove added monovalent ions.

Introduction of the monovalent ion salt solution into the diluting stream occurs, in accordance with another preferred form of the invention, at a predetermined time or point which is generally over half-way through the electrodialysis cycle. Preferably, the increased conductivity is induced near the end of the process, or approximately 80%–90% through the duration of the process.

In another embodiment of the invention, the apparatus includes one or more controllers which monitor the conductivity and/or specific divalent ion contents of the diluting cell solution. In that embodiment, the method includes the steps of determining the conductivity or concentration of such divalent ion(s), in either case represented by $C_b$, in the diluting stream at the beginning, $t_b$, of the process, and comparing that value against the concentration and/or conductivity $C_s$ determined at selected sample contact times, $t_s$, in the batch or continuous process. The controller then compares the measured values $C_s$ against the $C_b$ value, and generates a signal representative of those contact times, $t_c$, when the measured concentration and/or conductivity $C_c$ is below $C_b$ by some predetermined fraction and/or difference. Responsive to the signal, the conductivity of the diluting cells is increased at ti by adding a salt solution to increase the monovalent ion concentration within the diluting stream.

The latter form of the invention may alternatively be configured to operate in a continuous manner, wherein the conductivity and/or specific divalent ion concentration is continuously monitored (rather than at specific sample times) and after the set point $C_c$ is reached appropriate quantities of solutions are added on a continuous, programmed basis so that the net conductivity is a predetermined function of time. It will be obvious to those skilled in the art that in the case of a continuous demineralization mode samples will be taken at definite points in the apparatus, i.e. at specific contact times.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF PREFERRED EMBODIMENTS

The process of the present invention involves demineralization of liquid whey using electrodialysis. Briefly, the inventive method involves increasing the conductivity of solution being demineralized at certain, determinable points, times or periods during the electrodialysis process.

Electrodialysis is a process in which ions are transferred from one solution in a membrane-bounded cell through the membranes into another solution by applying a d.c. electrical potential across the cell. On one side of the cell, the membrane has a positive fixed electrical charge (anion selective membrane) and on the other side of the cell this membrane has a negative fixed electrical charge (cation selective membrane). Positively charged anion membranes will pass anions and repel cations. Conversely, negatively charged cation membranes will pass cations and repel anions.

Figure 1:
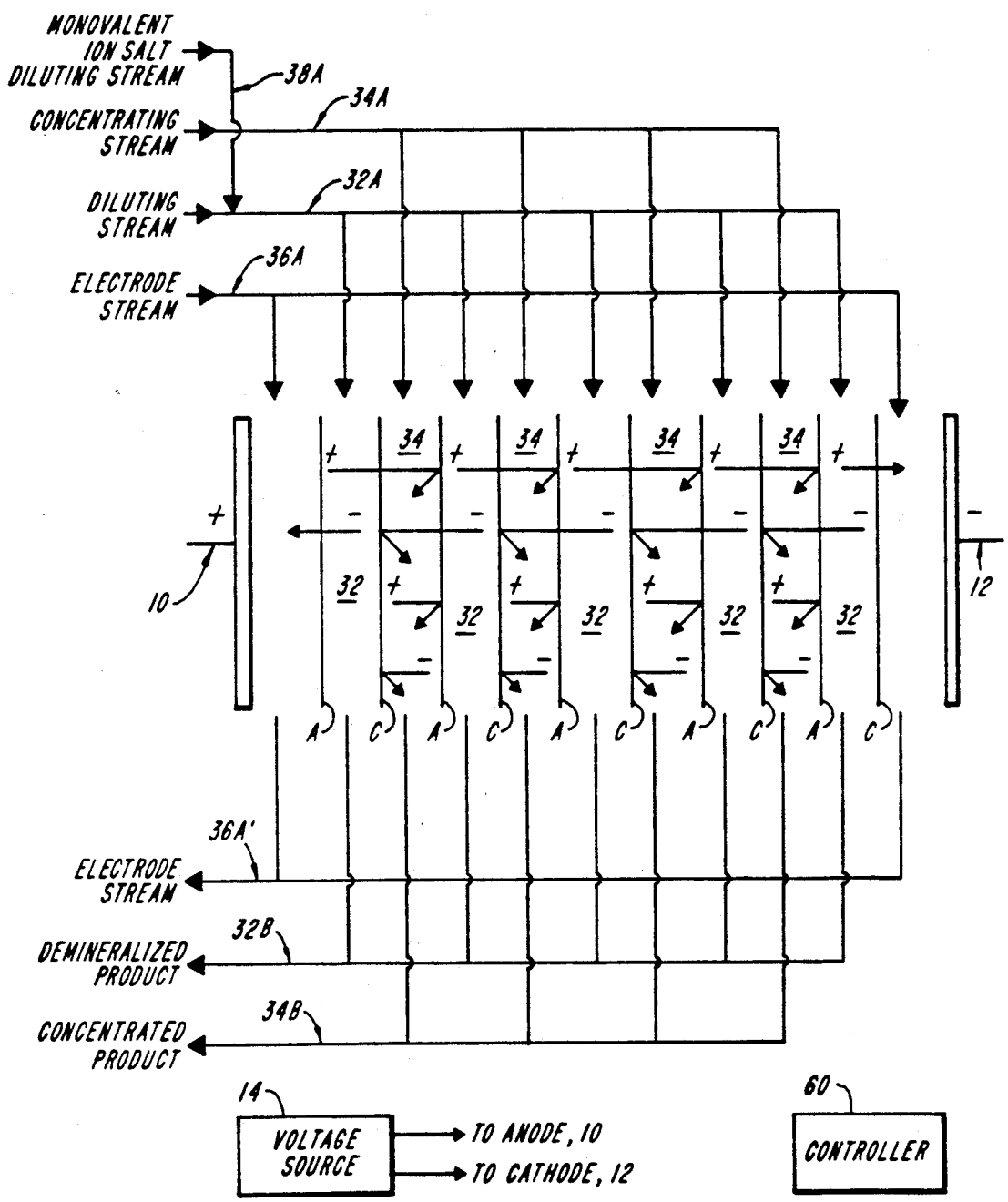
FIG. 1 is a diagrammatic representation of an exemplary electrodialysis apparatus which may be used in performing the process of the present invention.

In the preferred embodiment of the present invention, "dilution-concentration" type electrodialysis cells are used. FIG. 1 schematically illustrates this type of system. Generally, such a system includes an anode 10 and a cathode 12 positioned opposite one another. Between the two electrodes, a series of ion exchange membranes 20 are positioned in a stack configuration. These membranes are alternatively adapted for selectively passing positive ions (labeled "C", for cation selective membrane) and for selectively passing negative ions (labeled "A" for anion selective membrane). Each cation/anion pair of membranes forms a cell, or compartment. Depending on the direction of ion movement, each cell is either a diluting cell 32 or concentrating cell 34. The diluting cells 32 receive the material to be demineralized, which is generally introduced by diluting stream 32A. The concentrating cells 34 contain a suitable aqueous liquid, such as brine from a concentrating stream 34A, to receive the ions removed from the adjacent diluting cells 32. An electrode stream 36A provides an ionic solution in the regions between the outermost membranes and the respective electrodes, i.e. the electrode cell or chamber.

In operation, a d.c. voltage is applied by a source 14 across the anode 10 (positive) and cathode 12 (negative) causing positive ions (indicated by a "+" symbol) to move from the diluting cells 32, through the cation membranes (C) into the concentrating cells 34, from which their further travel toward the cathode 12 is substantially blocked by the adjacent anion membrane (A). Conversely, negative ions (indicated by a "−" symbol) pass from the diluting cells 32, through the anion membranes (A) into the concentrating cells 34 and substantially no further. As a result, during the electrodialysis process, the ion concentration in the diluting cells 32 decreases. The effluents from the cells are indicated by the demineralized product stream 32B, concentrated product stream 34B and electrode stream 36A'. A controller 60 regulates the flow of the respective streams and, as described below, the introduction of a monovalent ion salt stream 38A to the diluting stream 32A.

The level of demineralization achieved by practicing the process of the invention depends on the initial ash content, current density, and duration of time the whey solution stays in contact with the diluting cells 32. At selected times in a batch mode operation or at selected points in a continuous operation, the monovalent ion salt stream 38A introduces a solution containing a selected concentration of monovalent ions to the diluting stream 32A, as described further below. These ions are generally added in the form of a salt, such as potassium chloride or sodium chloride.

Figure 2:
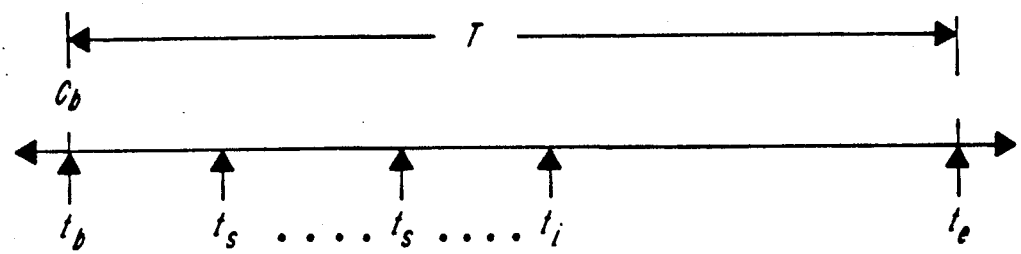
FIG. 2 is a schematic time-line illustrating a preferred, generalized control system applicable to the present invention.

The electrodialysis cycle T, shown in FIG. 2, is defined as beginning at the introduction of the material to be demineralized, $t_b$, through the diluting stream 32A into the diluting cells 32. The cycle ends $t_e$ at the recovery of substantially demineralized end-product from the diluting cells 32 via the demineralized product stream 32B. The minerals of the whey product move through the respective anion (A) and cation (C) membranes to achieve substantial removal of specified minerals. The amount of time which the flowing whey product remains in the electrodialysis apparatus, in part, affects the amount of demineralization which occurs.

For whey-based materials, at the initiation of the electrodialysis process, monovalent ions are largely free and unbound, while most divalent ions remain bound with protein complexes. Thus, the monovalent ions initially establish the dominant mode of charge transport across the cell membrane during the electrodialysis process. As the concentration of monovalent ions is decreased during the process, the divalent ions of the protein complexes are only slowly released and become available to support charge transport across the cell membranes. According to the present invention, monovalent ions are added to the diluting stream 32A to facilitate the release and movement of the divalent ions from the whey-based material. The specific timing or location of addition of the monovalent ions is dependent upon the level of conductivity depletion within the respective electrodialysis cells. That is, the exact timing or location of addition of monovalent ions is dependent upon the type and relative ratios of ions being extracted, the amount of whey being demineralized, and the applied voltage across the apparatus, among other variables. The timing or placement may readily be determined by one skilled in the art.

For an exemplary infant formula application, a batch system, such as that described above, may be used which contains three 200 cell pair electrodialysis stacks with 192 m² effective membrane area. Such a system has a capacity to produce approximately 2000 metric tons (or 4.4 million pounds) per year of 90% demineralized whey powder.

The concentration of one or more particular ions in the diluting stream may be monitored during the electrodialysis process. This may be done manually, using titration or other assay techniques, or automatically. Conductivity may also be monitored. When the ion concentration reaches a predetermined threshold level, and the concentration of one or more particular divalent ions has not been sufficiently depleted, the electrical conductivity of the solution in the diluting cells may be increased by addition of monovalent ion salt. Conductivity may be measured as an empirically determined indication of specific ion concentration. Again, in a manual system, once ion concentration is determined to fall below the desired threshold, the operator may adjust the conductivity of the diluting stream by controlling the flow of the monovalent ion salt through stream 38A. In an automatic system, once the threshold level is reached, the system may generate a signal for manual intervention, or may automatically introduce one or more aliquots of an appropriate set ion solution to affect conductivity optionally on a programmed basis. Alternatively, the controller 60 may automatically, on a continuous, programmed basis, add monovalent ion salt stream 38A to establish a desired conductivity as a function of time once the above-mentioned threshold has been reached.

FIG. 2 illustrates one preferred schematic time-line for a control system which may be used to practice the present invention. As illustrated, specific ion concentration or conductivity $C_b$ may be measured at the beginning of the electrodialysis cycle T, at $t_b$. This conductivity and/or concentration value is stored in the controller 60. At predetermined or random points $t_s$ in the batch or continuous process T, aliquots of the material from the diluting stream 32B from diluting cells 32 are taken, and specific ion concentration and/or concentration $C_s$ is measured. This value is compared against the stored value $C_b$. When the value $C_s$ falls below a predetermined percentage of or difference from $C_b$, a monovalent ion salt solution from stream 38B is added to the diluting stream 32A at $t_i$, and the electrodialysis process continues. Generally, after a preset contact time elapses, the process is deemed completed and the product is recovered. Typically, the process is only deemed completed upon attainment of one or more predetermined specific ion concentration levels. Alternatively, the controller 60 may generate a signal representative of these contact times when $C_s = C_e$.

The endpoint for electrodialysis demineralization of whey-based material is often based on a calcium to protein ratio subject to maximum levels of specific ions, especially sodium, phosphorous, and magnesium. Endpoint is generally determined by conductivity or calcium titration. Depending on the type and freshness of the whey material, and on seasonal variations in the ash composition of milk, as well as the end-user of the product, the level of demineralization based on total ash varies typically between 85% and 95% in the case of RMW intended for infant food.

In practicing the process of the invention, a monovalent salt, such as potassium chloride, is added to the diluting stream 32A via stream 38A, to increase the conductivity of that solution. The addition enables a more rapid transfer of sufficient divalent ions to achieve the desired batch endpoint earlier than would otherwise be the case.

Figure 3:
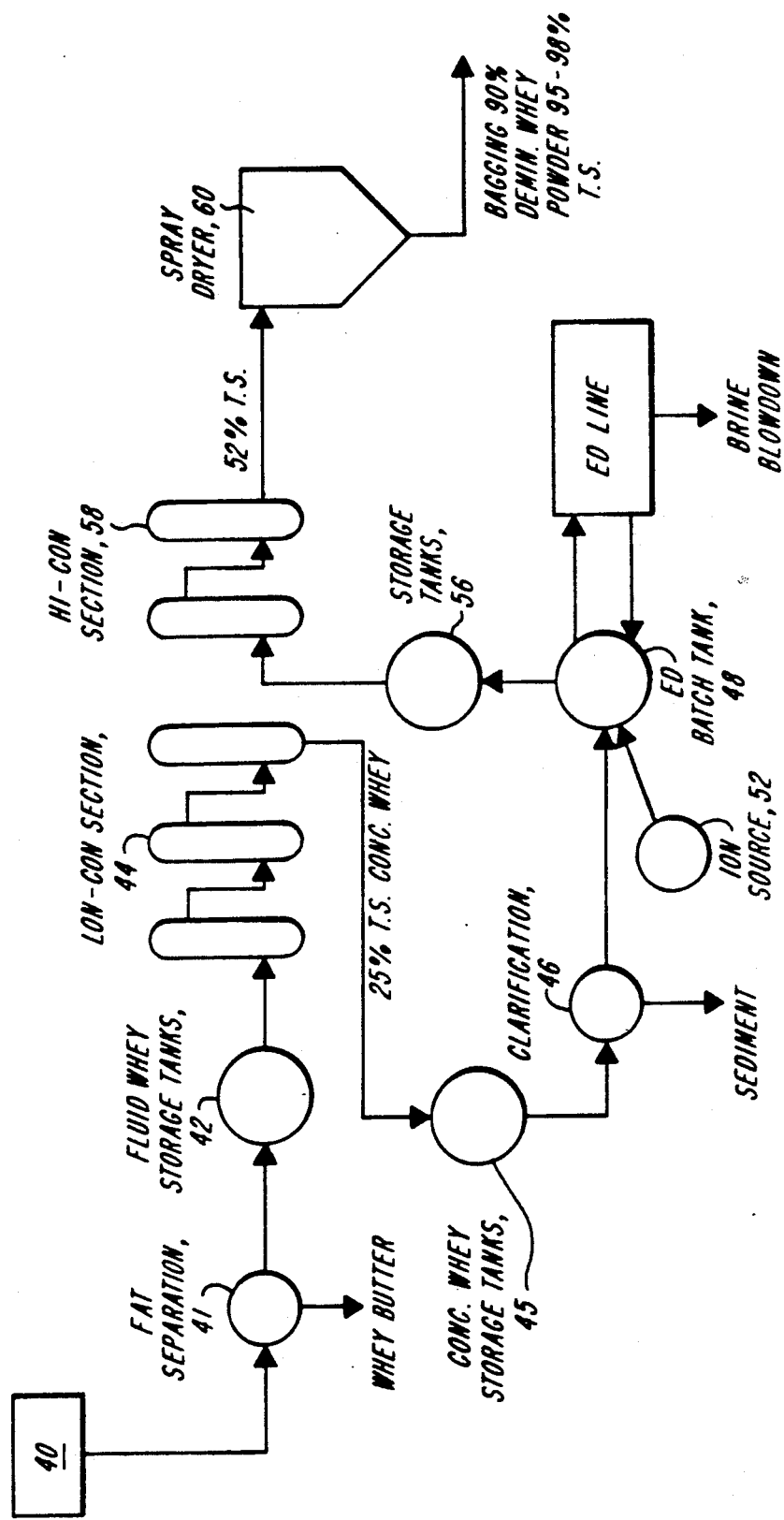
FIG. 3 is a schematic diagram showing an overall industrial electrodialysis demineralization system embodying the present invention.

A whey electrodialysis plant utilizing the system of the present invention is illustrated in FIG. 3. Raw whey from cheese vats 40 is processed through a fat separator 41 to fluid whey storage tanks 42. The essentially fat-free fluid whey is then processed through low-concentration sections of a multi-effect evaporator 44. At this point, the fluid whey is normally within the range of 23-27% solids content. This concentrated whey is passed to storage tanks 45, from which it is subsequently moved for clarification at apparatus 46 prior to electrodialysis. Alternatively, the whey may be concentrated by reverse osmosis or a combination of reverse osmosis and evaporation.

Electrodialysis of the clarified whey may be performed by recirculating the whey in an electrodialysis batch tank 48, through the diluting cells of that electrodialysis apparatus. Alternatively, a continuous electrodialysis apparatus may be used. A monovalent ion source 52 is associated with the electrodialysis apparatus to provide monovalent ions to the diluting cells in accordance with the invention. Average electrodialysis batch duration, i.e. the duration of an electrodialysis cycle may be about four to six hours. At one or more selected points during the batch cycle, a predetermined amount of monovalent ions from ion source 52 are added to the diluting stream, thereby increasing conductivity of such stream, and enhancing removal of divalent ions. Following demineralization, the demineralized whey product may be temporarily stored in storage tanks 56, then further concentrated by passing the demineralized product through the high-concentration sections of the multi-effect evaporator 58. Following this second concentrating step, the whey product is approximately 50-54% solids. This product may then be passed through a spray dryer 60 to achieve a whey powder having about 95-98% solids.

The invention is further described in the following, non-limiting examples.

EXEMPLIFICATION

The following exemplary runs were performed on a Stackpack ®, bench scale batch type electrodialysis apparatus available from Ionics, Incorporated, Watertown, Mass. In both Examples below, a ten cell pair stack configuration was used, with 9×10 inch membranes available from Ionics, Incorporated, of anion type AR103QZL386 and cation type CR61CZL386.

EXAMPLE 1

| Min. | Amp-Min. | Ca (mg/l)* | Vol (l)* | Removal Rate mgCa/Min. | Increm. Rate mgCa/Amp-Min. |
|---|---|---|---|---|---|
| 0 | 0 | 1364 | 9.2 | | |
| | | | | 48 | 12 |
| 131 | 500 | 833 | 7.6 | | |
| | | | | 10 | 10 |
| 156 | 528 | 803 | 7.5 | | |
| | | | | 6 | 11 |
| 172 | 540 | 790 | 7.4 | | |
| | | | | KCl Added | |
| 172 | 540 | 734 | 7.4 | | |
| | | | | 61 | 25 |
| 192 | 586 | 590 | 7.3 | | |
| | | | | 28 | 24 |
| 202 | 598 | 550 | 7.3 | | |
| | | | | 19 | 25 |
| 212 | 607 | 524 | 7.2 | | |

* = Smoothed

For Example 1, the initial electrode rinse stream was 3.9 liters of dilute $H_2SO_4$ solution (pH 1.6). The initial concentrating stream was 4.0 liters of water, acidified to pH 2.1 with HCl, and the demineralization stream was 9 liters of sweet whey solution at 25% total solids. The whey solution was prepared from Teklac ® sweet whey powder obtained from the Foremost Whey Products Division of Wisconsin Dairies Cooperative.

The data in this Example was smoothed using linear regression to account for minor variations in the raw data due to sampling error. At a point about 81% through the electrodialysis cycle, as determined for a 212 minute cycle time, twenty grams of reagent grade potassium chloride (KCl) were added. As demonstrated by the data, the removal rate of the divalent ion, Ca, diminishes over time. Upon addition of KCl, the removal rate increased ten-fold. Note that the calcium ion concentration continues to diminish, even after the KCl addition. This measurement is consistent with the fact that Ca is being continuously removed from solution, without replenishment, until it reaches the desired level. The addition of the monovalent salt, KCl, also caused an increase in the incremental removal rate of the monitored divalent ion, calcium (Ca). This incremental rate increase represents a more than doubling of the incremental removal rate of the target divalent ion by the addition of the monovalent ion, potassium. This Example was terminated once the calcium level reached 524 mg/ml.

The applied voltage was initially 10 volts direct current (VDC) and was increased gradually until reaching 44 VDC after 100 minutes. The voltage remained constant at 44 VDC throughout the remainder of the batch. The direct current (DC) amperage peaked at 6.8 amperes, six minutes into the cycle, and then gradually declined as the resistivity of the whey solution increased. At the point of KCl addition (172 minutes) the DC amperage was 0.8 amperes. Upon addition of KCl, the current increased momentarily to 2.9 amperes DC and then declined steadily to 0.8 amperes at endpoint.

The conductivity of the whey solution was initially 12,400 $\mu$mho/cm. It declined steadily to 500 $\mu$mho/cm at the point of KCl addition. Upon addition of KCl the whey conductivity increased momentarily to 2,800 $\mu$mho/cm, then declined steadily to 550 $\mu$mho/cm at endpoint. From time 125 minutes to the end of the cycle, the brine stream conductivity was controlled by water addition within the range of 3,000 to 4,500 mho/cm. The operating temperature was maintained within the range 30°-35° C.

By calculation, using the actual calcium removal rate achieved after KCl addition compared with the calcium removal rate immediately prior to KCl addition (and assuming the calcium removal rate would have remained constant at this value had KCl not been added), it can be shown that the endpoint of 524 mg/l calcium was reached in a 270 minute shorter period of time (56% shorter) via the strategic addition of KCl.

EXAMPLE 2

| Min. | Amp-Min. | Ca (mg/l)* | Vol (l)* | Removal Rate mg/Ca/Min. | Increm. Rate mg/Amp. Min |
|---|---|---|---|---|---|
| 0 | 0 | 1500 | 9.1 | | |
| | | | | 46 | 13 |
| 135 | 487 | 1100 | 7.5 | | |
| | | | | KCl Added | |
| 135 | 487 | 1196 | 7.5 | | |
| | | | | 112 | 42 |
| 163 | 558 | 834 | 7.3 | | |
| | | | | 44 | 41 |

-continued

| Min. | Amp-Min. | Ca (mg/l)* | Vol (l)* | Removal Rate mg/Ca/Min. | Increm. Rate mg/Amp. Min |
|---|---|---|---|---|---|
| 172 | 570 | 773 | 7.2 | | |
| | | | | 29 | 40 |
| 186 | 582 | 707 | 7.2 | | |
| | | | | KCl Added | |
| 186 | 582 | 871 | 7.2 | | |
| | | | | 105 | 49 |
| 205 | 622 | 610 | 7.0 | | |
| | | | | 47 | 47 |
| 215 | 634 | 532 | 7.0 | | |
| | | | | 29 | 47 |
| 225 | 642 | 478 | 7.0 | | |

* = Smoothed

In Example 2, the settings were substantially the same as in Example 1 above, however in this example the salt (KCl) was added at different times in the run cycle. Some data was smoothed, using standard linear regression analysis, to account for sampling errors.

As demonstrated in this Example, there is a significant increase in removal rate of the divalent ion, calcium, upon addition of the monovalent salt. Both the incremental removal rate as a function of current density, and the overall calcium removal rate essentially tripled upon introduction of the monovalent salt. The salt was added first at approximately 60% of the electrodialysis cycle, using 225 minutes as the endpoint, and again at approximately 83% of the cycle. The subsequent addition of KCl did not increase the incremental removal rate as significantly as the initial addition of KCl, in part due to the fact that the rate remained relatively high after the first addition.

As demonstrated in the above examples, the incremental removal rate of the desired mineral ion, calcium, was increased with the addition of potassium chloride at certain points in the demineralization process. Specifically, at a point in time beyond 50% of the cycle, there appears to be significant increase in removal rates. Further, this data demonstrates that increasing the conductivity of the diluting stream by the introduction of a monovalent salt increases the rate of demineralization of divalent ions.

During many electrodialysis applications, such as batchwise demineralization of sweet whey, the DC voltage is controlled at all times near to its then maximum practical level. Therefore, the only opportunity to increase current density is by increasing the conductivity of the limiting stream, i.e., the stream being demineralized. Although this is contrary to the usual purpose of electrodialysis, it has been illustrated above how the timely addition of particular ions to the diluting stream can enhance certain electrodialysis processes.

While the process of the Present invention is disclosed in a Preferred embodiment for removal of selected minerals from liquid, whey-based materials, it may also be used in a variety of electrodialysis applications in which the removal of one particular ion, or ions, is predominantly important from a solution containing those particular ions and other ions. One example is the removal of sodium to a specified dietary level from a food material such as liquid egg protein. Another example is the removal of radionuclide contaminants, such as strontium or cesium ions, from milk, drinking water, or other liquid intended for human or animal consumption.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method for electrodialytically demineralizing a liquid whey-based material comprising the steps of:
   A. introducing said liquid material to an electrodialysis apparatus including a pair of electrodes and an alternating succession of diluting cells and concentrating cells between said electrodes, adjacent ones of said cells being separated by ion exchange membranes, said liquid material being introduced to said diluting cells,
   B. applying a voltage across said electrodes, and
   C. during said voltage applying step, increasing the electrical conductivity of said liquid material in said diluting cells.

2. The method of claim 1 wherein said step C of increasing said conductivity comprises introducing a monovalent salt solution into said liquid material.

3. The method of claim 1, wherein said step C of increasing said conductivity includes the substeps of:
   i. monitoring at least one of (a) the concentration of one or more specific ions and (b) the electrical conductivity in said liquid material, and
   ii. responsive to said monitoring, adjusting the electrical conductivity of said liquid material.

4. The method of claim 3 wherein said step C of increasing said conductivity comprises introducing a monovalent salt solution to said liquid material.

5. The method of claim 1, wherein said step C of increasing said conductivity occurs at a predetermined contact time.

6. The method of claim 5 wherein said step C of increasing said conductivity comprises introducing a predetermined amount of a monovalent salt solution into said liquid material.

7. The method of claim 1, wherein said method is performed on a cyclical basis, each cycle having a period of about T and having a beginning point $t_b$ at which said whey-based material is introduced into said diluting cells, and a termination point $t_e$ at which substantially demineralized whey-based material is removed from said apparatus, and
   wherein said step C of increasing said conductivity is performed at a preselected time during said cycle.

8. The method of claim 7 wherein said step C of increasing said conductivity comprises introducing a predetermined amount of a monovalent salt solution into said liquid material.

9. The method of claim 8 wherein said preselected time for introducing said monovalent salt solution is at a point displaced in time greater than fifty percent of T from $t_b$.

10. The method of claim 9 wherein said reselected time for introducing said monovalent salt solution is at a point displaced in time in the range of between about 80% to 90% of T from $t_b$.

11. The method of claim 1, wherein said step C of increasing said conductivity includes the substeps of:
   i. monitoring at least one of (a) the concentration of one or more specific ions and (b) the conductivity of said liquid material, and ii. responsive to said monitoring, increasing said conductivity and said liquid material when said concentration or conductivity is at a predetermined level.

12. The method of claim 11 wherein said step C of increasing said conductivity comprises introducing a predetermined amount of a monovalent salt solution into said liquid material.

13. The method of claim 7 comprising the further step of controlling said electrodialysis cycle, including the substeps of:
   i. identifying said beginning point, $t_b$, of said cycle;
   ii. at $t_b$, determining concentration $C_b$ of a preselected ion of said liquid material;
   iii. identifying said termination point, $t_e$, of said cycle;
   iv. identifying at least one sample time, $t_s$, following $t_b$ and prior to $t_e$;
   v. at each $t_s$, determining an associated concentration $C_s$ of said preselected ion in said liquid material;
   vi. at each $t_s$, comparing said associated $C_s$ against $C_b$, and identifying instances when the difference between $C_s$ and $C_b$ is greater than a predetermined threshold;
   vii. generating a control signal representative of said instances of step vi; and
   viii responsive to said control signal, effecting an increase in conductivity of said liquid material.

14. The method of claim 13 wherein said step viii of increasing said conductivity comprises introducing a predetermined amount of a monovalent salt solution into said liquid material.

15. A method for increasing the rate of removal of one or more non-monovalent ions from a liquid, milk-based material during electrodialytic demineralizing of said material, comprising the steps of:
   A. introducing said liquid material to an electrodialysis apparatus including a pair of electrodes and an alternating succession of diluting cells and concentrating cells between said electrodes, adjacent ones of said cells being separated by ion exchange membranes, said liquid material being introduced to said diluting cells,
   B. applying a voltage across said electrodes, and
   C. during said voltage-applying step, increasing the electrical conductivity of said liquid material in said diluting cells by adding one or more monovalent ion salts to said material.

16. The method of claim 15 wherein said step C occurs at a predetermined range of contact times.

17. The method of claim 15 wherein said method is performed on a cyclical basis, each cycle having a period of about T and having a beginning point $t_b$ at which said liquid material is introduced into said diluting cells, and a termination point $t_e$ at which substantially demineralized liquid material is removed from said apparatus, and
   wherein said step C is performed at a preselected time or times during said cycle.

18. The method of claim 17 wherein said preselected time or times for introducing said one or more monovalent ion salts is at a point or points displaced in time greater than 50% of T from $t_b$.

19. The method of claim 18 wherein said preselected time or times for introducing said one or more monovalent ion salts is at a point displaced in time in a range of between about 80% to 90% of T from $t_b$.

20. A method for improving the rate of removal of calcium from milk or a liquid derivative thereof containing calcium, comprising the steps of:
   A. introducing said milk or liquid derivative into diluting cells of an electrodialysis apparatus;
   B. passing a substantially direct electric current through said diluting cells thereby removing electrolyte from said cells, and
   C. during said passing step, adding potassium chloride to said milk or liquid derivative thereof thereby increasing the rate of removal of calcium per Ampere-minute of said current passed.

* * * * *